Feb. 3, 1925.                                           1,524,770
                    C. G. WOOD
                     CLUTCH
                  Filed Dec. 5, 1921
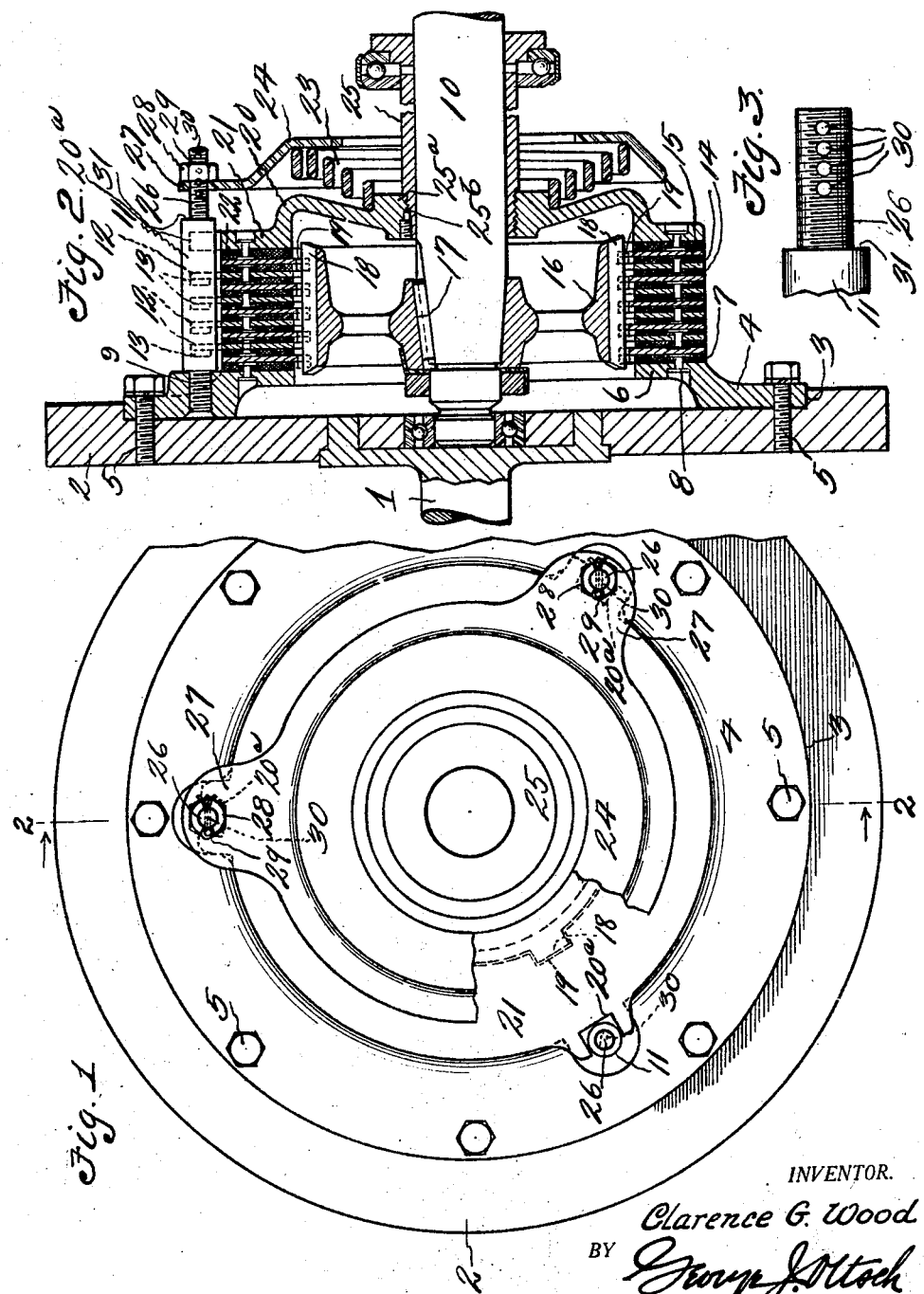
INVENTOR.
Clarence G. Wood
BY
George J. Itoch
ATTORNEY.

Patented Feb. 3, 1925.

1,524,770

UNITED STATES PATENT OFFICE.

CLARENCE G. WOOD, OF MUNCIE, INDIANA, ASSIGNOR TO HOOSIER CLUTCH COMPANY, OF MUNCIE, INDIANA, A CORPORATION OF INDIANA.

CLUTCH.

Application filed December 5, 1921. Serial No. 519,926.

*To all whom it may concern:*

Be it known that I, CLARENCE G. WOOD, a citizen of the United States, residing at Muncie, in the county of Delaware and State of Indiana, have invented certain new and useful Improvements in Clutches, of which the following is a specification.

The invention relates to clutches of a self contained stud drive multiple disc type, and has for its object to provide a clutch of this character which is simple in construction and so constructed that the fly wheel may be straight faced, the clutch made up complete and shipped ready for installation and without requiring any fitting or adjustments to be made, which will materially reduce the present assembly cost. Also to provide a clutch of the disc type which comprises a simple structure, and the minimum amount of machining, thereby reducing the cost to a minimum.

A further object is to provide a clutch comprising a straight faced fly wheel adapted to be carried by a drive shaft, said fly wheel having a counterbore for the reception of a back plate, which backplate supports spaced guide studs cooperating with notches of drive discs, said drive discs having disposed therebetween discs carried by a driven shaft, which last named discs engage adjacent faces of fibre discs carried by the drive discs. Also an object is to provide a pressure plate engaging the outer disc on the driven shaft and guidable on the guide studs and normally forced inwardly by means of a clutch spring interposed between the pressure plate and a cover plate, said cover plate being supported on the outer ends of the guide studs.

A further object is to provide means whereby the clutch spring may be uniformly tensioned for imparting a uniform pressure on the outer disc through the medium of the pressure plate, said tensioning being accomplished through the medium of uniformly spaced apertures in threaded ends of the studs through which pins extend and adapted to be engaged by uniformly shaped nuts, the inner sides of which nuts engage the outer face of the cover plate, thereby allowing the cover plate to be moved inwardly a predetermined and equal distance at all sides thereof.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of a clutch, part of the cover plate being broken away to better illustrate the structure.

Figure 2 is a vertical sectional view through the clutch taken on line 2—2 of Figure 1.

Figure 3 is an enlarged detailed view of the outer end of one of the guide studs, showing a plurality of apertures in the threaded portion thereof.

Referring to the drawing, the numeral 1 designates a drive shaft which may lead from any conventional form of engine, and 2 a straight face fly wheel carried thereby, which fly wheel may be formed from any kind of material desired. The fly wheel 2 has one of its faces preferably provided with a counterbore 3, in which counterbore a back plate 4 is received, and held by means of bolts 5. It will be seen that the fly wheel may be formed from stock material, and that the machine work thereon is reduced to a minimum. The back plate 4 may be cast from light material, if so desired, such for instance as aluminum, thereby lightening the construction. Back plate 4 is provided with a flange 6, to which flange a fibre disc 7 is secured by means of rivets 8.

Threaded in the back plate 4 as at 9, and in parallel relation to the drive shaft 1 and to a driven shaft 10 are guide studs 11, which guide studs guide drive discs 12 in the notches 13 of which the guide studs 11 are received. Drive discs 12 have secured thereto fibre discs 14, which fibre discs are disposed on each side of the drive discs and engage adjacent discs 15 carried by a drive member 16, keyed at 17 on the driven shaft 10. The engagement between the discs 15 and the drive member 16 is effected through the medium of ribs 18 carried by said member 16, which ribs engage in notches 19 of the discs 15. It will be seen that when the drive discs 12 and their fibre discs 14 are forced into frictional engagement with the driven discs 15, that the driven shaft 10 will be revolved, and during the movement of the parts from inoperative to operative position and from operative to inoperative position, the discs 12 and 15 are guided on the guide studs 11 and the ribs 18. It has been found that manufacturers, especially manufacturers of motor vehicles, desire clutches which are self contained and which are shipped ready adjusted and may be instantly installed without trouble and expense of assembling and adjusting the clutch after the same is received. The adjusting of the friction between the discs is accomplished through the medium of a pressure plate 20, which pressure plate has a flange 21 provided with a fibre disc 22, which engages one of the driven discs 15 and which is adapted to be forced into frictional and binding engagement with said disc 15 by means of a helical spring 23 interposed between the pressure plate and the cover plate 24. It will be seen that when the cover plate 24 is in a parallel plane with the flange 21 of the pressure plate and the discs of the clutch, that the helical spring 23 which surrounds the driven shaft 10 will exert a uniform pressure on the discs when the pressure plate 20 is allowed to move inwardly under the influence of the spring 23 when the release sleeve 25 is moved inwardly, thereby causing a uniform binding of the discs.

To insure the accurate inward movement of the cover plate 24 during clutch adjustment operation for instance when the fibre discs become worn and in such a manner that the cover plate 24 will move inwardly in parallel relation to the pressure plate 20, threaded extensions 26 are provided on the outer ends of the guide studs 11, which threaded extensions extend through apertures in the lugs 27 carried by the cover plate 24. Threaded on the extensions 26 and engaging the outer faces of the lugs 27 are nuts 28, which nuts hold the cover plate 24 in any position to which it may have been moved. When it becomes necessary to adjust the clutch by moving the cover plate 24 inwardly into a closer parallel relation to the pressure plate 20, the nuts 28 are tightened and the cotter pins 29 which extend through the threaded extensions 26 and engage the outer sides of the nuts 28, are removed, after which the clutch is adjusted to its proper position and then the cotter pins 29 are passed through the nearest apertures which extend through the extensions 26 and are equally spaced from the shoulders 31. After the cotter pins have been so positioned the nuts 28 are threaded outwardly on the extensions 26 until they engage the cotter pins, at which time they will be properly positioned for holding the cover plate 24 in parallel relation to the pressure plate 20, thereby causing the clutch spring 23 to exert a uniform pressure on the pressure plate and consequently cause a uniform pressure to be exerted on the discs of the clutch.

From the above it will be seen that a self contained disc clutch is provided, which is simple in construction, one wherein the machine work has been reduced to a minimum and so constructed that it may be shipped in an adjusted position and installed without the necessity of adjusting. Also that adjusting means is provided whereby a uniform and accurate pressure on the discs is maintained at all times, and one wherein the degree of pressure may be easily and quickly varied and adjusted.

During the rotation of the fly wheel 2, the pressure plate 20 also rotates for the reason that said pressure plate is axially movable and guidable on the guide studs 11 through the medium of notches 20$^a$ in the guide plate and in which notches the guide studs 11 are received. The inner end 25$^a$ of the release sleeve 25 is attached as at 25$^b$ to the pressure plate 20, therefore it will be seen that when the release sleeve 25 is moved the pressure plate 20 will be moved.

The invention having been set forth what is claimed as new and useful is:—

1. A clutch comprising a drive member, a fly wheel carried by said drive member and provided with a counterbore, a flanged member having guide studs extending therefrom and disposed in the counterbore and detachably carried by the fly wheel, a plurality of discs arranged concentric with the flange of the flanged member, alternate drive discs being guidable axially on said guide studs, a driven member, alternate driven discs being guidable on said driven member, a releasing sleeve carried by the driven member, a pressure disc carried by the releasing sleeve and engaging the outer driven disc and guidable on the studs, threaded extensions carried by the studs, a cover plate carried by the threaded extensions, a spring surrounding the releasing sleeve and interposed between the pressure disc and the cover plate, and means whereby said cover plate may be quickly and accurately adjusted in parallel relation to the pressure plate.

2. The combination with a clutch comprising a drive member including guide studs, a driven member, friction discs axially movable on said members, some of said discs being axially guidable on said guide studs and some axially guidable on the driven member, of means for imparting a uniform pressure on said discs, said means comprising a pressure plate guidable on the guide studs, threaded extensions carried by the studs having a plurality of apertures therein uniformly spaced from the inner ends thereof, a cover plate having apertures through which the threaded extensions of the studs extend, nuts threaded on said extensions and engaging the cover plate, cotter pins extending through the apertures in the threaded extensions located at uniform distances from the inner ends thereof and adapted to be engaged by the outer sides of the nuts, and a spring interposed between the pressure plate and the cover plate.

3. The combination with a disc clutch having a pressure plate for forcing the discs into frictional engagement, of means for imparting a uniform pressure on the pressure plate, said means comprising threaded lugs, a plate having apertures through which the threaded lugs extend, a spring interposed between the plate and the pressure plate, means for holding said plate in uniform parallel relation to the pressure plate, said means comprising nuts threaded on the threaded extensions and engaging the plate, and pins extending through the threaded lugs at uniform distances from the pressure plate and engaging the outer sides of the nuts.

In testimony whereof I affix my signature.

CLARENCE G. WOOD.